United States Patent
Usuda et al.

(10) Patent No.: US 12,308,487 B2
(45) Date of Patent: May 20, 2025

(54) COMBUSTOR AND FUEL CELL SYSTEM INCLUDING SAME

(71) Applicants: NISSAN MOTOR CO., LTD., Yokohama (JP); RENAULT S.A.S., Boulogne-Billancourt (FR)

(72) Inventors: Masahiro Usuda, Kanagawa (JP); Susumu Maeshima, Kanagawa (JP); Tomokatsu Himeno, Kanagawa (JP); Vincent Lawlor, Stainz (AT); Daniel Mair, Lannach (AT); Robert Poeschl, Gratwein-Straßengel (AT); Bernd Reiter, Kainbach bei Graz (AT)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 588 days.

(21) Appl. No.: 17/640,089

(22) PCT Filed: Jul. 29, 2020

(86) PCT No.: PCT/JP2020/029105
§ 371 (c)(1),
(2) Date: Mar. 3, 2022

(87) PCT Pub. No.: WO2021/044766
PCT Pub. Date: Mar. 11, 2021

(65) Prior Publication Data
US 2022/0320534 A1 Oct. 6, 2022

(30) Foreign Application Priority Data
Sep. 4, 2019 (JP) ................................. 2019-161388

(51) Int. Cl.
*H01M 8/04014* (2016.01)
*F23C 13/00* (2006.01)
(Continued)

(52) U.S. Cl.
CPC ......... *H01M 8/04014* (2013.01); *F23C 13/00* (2013.01); *F23K 5/22* (2013.01);
(Continued)

(58) Field of Classification Search
CPC ........... H01M 8/04014; H01M 8/0631; H01M 8/0643; H01M 8/04022; H01M 8/0662;
(Continued)

(56) References Cited

U.S. PATENT DOCUMENTS

| | | | |
|---|---|---|---|
| 6,077,620 A | 6/2000 | Pettit | |
| 2002/0006535 A1* | 1/2002 | Woods | F23D 14/22 95/55 |
| 2010/0139599 A1* | 6/2010 | Vestin | F23D 11/443 123/143 B |

FOREIGN PATENT DOCUMENTS

JP 11-176461 A 7/1999

* cited by examiner

*Primary Examiner* — Ula C Ruddock
*Assistant Examiner* — Mary Grace Byram
(74) *Attorney, Agent, or Firm* — Foley & Lardner LLP

(57) ABSTRACT

A combustor, including: a catalyst bed portion supporting a catalyst capable of promoting a combustion reaction of fuel; a vaporizer which is arranged on the downstream side of the catalyst bed portion with respect to a flow of the fuel going through the catalyst bed portion and is configured to be able to use a combustion gas generated from the combustion reaction as a hot fluid; a manifold portion which is outside the catalyst bed portion and guides air in a direction opposite to the flow of the fuel going through the catalyst bed portion and has a wall portion on which a sidewall of the vaporizer is projected; and a fuel introducing portion configured to penetrate the wall portion of the manifold portion so that the fuel evaporated by the vaporizer can be introduced into the manifold portion.

20 Claims, 9 Drawing Sheets

(51) Int. Cl.
*F23K 5/22* (2006.01)
*H01M 8/0612* (2016.01)
*H01M 8/0662* (2016.01)

(52) U.S. Cl.
CPC ..... *H01M 8/04022* (2013.01); *H01M 8/0631* (2013.01); *H01M 8/0643* (2013.01); *H01M 8/0662* (2013.01); *F23C 2900/13001* (2013.01); *F23K 2300/205* (2020.05)

(58) Field of Classification Search
CPC ............ F23C 2900/13001; F23C 13/00; F23K 2300/205; F23K 5/22
See application file for complete search history.

COMBUSTOR AND FUEL CELL SYSTEM INCLUDING SAME

TECHNICAL FIELD

The present invention relates to a combustor and a fuel cell system including such a combustor in an off-gas passage of a fuel cell, and particularly relates to a technique for promoting mixing of fuel and air in a combustor in a fuel cell system wherein fuel is stored in a liquid state.

BACKGROUND ART

JPH11-176461A discloses the following as a technique for promoting mixing of fuel and air with respect to a fuel cell system in which fuel is stored in a liquid state. A catalyst bed portion supporting a catalyst for promoting the combustion reaction of fuel is provided, an evaporative heat exchanger is provided on the downstream side thereof, and a combustion gas from the catalyst bed portion is used as hot fluid and fuel is used as cold fluid to operate the evaporative heat exchanger. Then, the fuel evaporated in this way is supplied to a mixing chamber via a fuel supply pipe routed around the outside of a casing containing the catalyst bed portion in a direction opposite to a gas flow in the catalyst bed portion, and after mixing the fuel and air, a mixed gas is introduced into the catalyst bed portion and combusted on the catalyst.

SUMMARY OF INVENTION

According to the technique of JPH11-176461A, since fuel is evaporated by the evaporative heat exchanger and then mixed with air in a gaseous state, it is possible to accelerate the mixing as compared with the case of mixing by injection of fuel, that is, mixing of fuel and air in a state of droplets. However, since a mixing chamber is provided on the immediate upstream side of a catalyst bed portion, there is a problem that it is not easy to ensure a distance required for mixing between the mixing chamber and the catalyst bed portion. Further, since fuel, after once evaporated, is supplied to the mixing chamber via the fuel supply pipe that is routed around the outside of the casing of the catalyst bed portion and is exposed to the outside air all around, fuel may be cooled in the process of flowing through the fuel supply pipe, causing condensation. When condensation occurs, as in the case of mixing by injection, there is a concern that the mixture of fuel and air tends to be uneven and a temperature difference may occur in combustion on the catalyst, causing the combustion gas to fail to have sufficient thermal energy, or causing the harmful exhaust components contained in the combustion gas to increase.

In consideration of the problems described above, the present invention is intended to provide a combustor which can better promote mixing of fuel and air and a fuel cell system including the combustor.

In one aspect of the present invention, a combustor is provided, which includes a catalyst bed portion supporting a catalyst capable of promoting a combustion reaction of fuel; a vaporizer which is arranged on the downstream side of the catalyst bed portion with respect to a flow of the fuel going through the catalyst bed portion and is configured to be able to use a combustion gas generated from the combustion reaction as a hot fluid; a manifold portion which is outside the catalyst bed portion and guides air in a direction opposite to the flow of the fuel going through the catalyst bed portion and has a wall portion on which a sidewall of the vaporizer is projected; and a fuel introducing portion configured to penetrate the wall portion of the manifold portion so that the fuel evaporated by the vaporizer can be introduced into the manifold portion.

In other aspect, a fuel cell system is provided in which such a combustor is included in an off-gas passage of a fuel cell.

DESCRIPTION OF EMBODIMENTS

Hereinafter, embodiments of the present invention will be described with reference to the drawings.

(Overall Configuration of Fuel Cell System)

Figure 1:
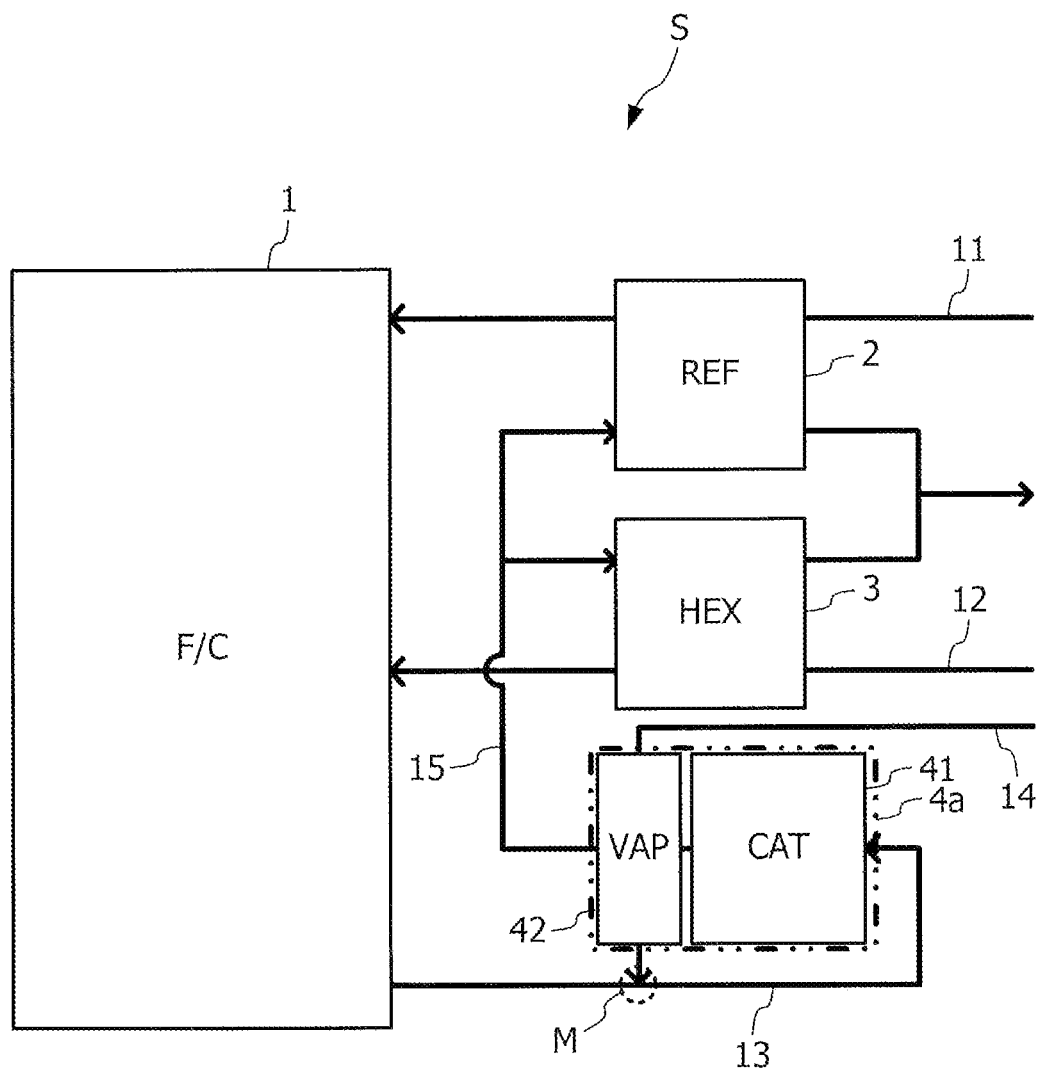
FIG. 1 is a schematic diagram illustrating a basic configuration of a fuel cell system according to an embodiment of the present invention.

FIG. 1 illustrates a basic configuration of a fuel cell system S according to an embodiment of the present invention.

The fuel cell system S according to this embodiment (hereinafter referred to as "the fuel cell system", sometimes simply referred to as "the system") can be mounted on an electric vehicle, and generates electric power to be supplied to an electric motor for traveling that the vehicle has. The generated electric power may be directly supplied to the electric motor, or may be used to charge a battery which is arranged so as to be able to supply electric power to the electric motor.

The fuel cell system S includes a fuel cell stack 1, a fuel reformer 2, an air heater 3, and a combustor 4a as main components related to this embodiment.

The fuel cell stack (hereinafter may simply be referred to as "the stack") 1 consists of stacking a plurality of fuel cells or fuel-cell unit cells, and the individual fuel cells serving as power generation sources are each, for example, a solid oxide fuel cell (SOFC). The fuel cell system S includes an anode gas supply passage 11 and a cathode gas supply passage 12. The fuel cell stack 1 receives fuel gas through the anode gas supply passage 11 while receiving oxidant gas through the cathode gas supply passage 12. In this embodiment, the fuel gas is hydrogen and the oxidant gas is oxygen. The reaction related to power generation in the anode electrode and the cathode electrode of the solid oxide fuel cell is expressed by the following equations (1.1) and (1.2).

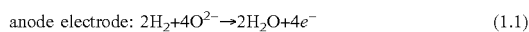

$$\text{anode electrode: } 2H_2 + 4O^{2-} \rightarrow 2H_2O + 4e^- \quad (1.1)$$

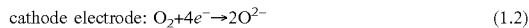

$$\text{cathode electrode: } O_2 + 4e^- \rightarrow 2O^{2-} \quad (1.2)$$

Off-gases after the power generation reaction are discharged from the fuel cell stack 1 to off-gas discharge passages. FIG. 1 shows only a discharge passage 13 on the cathode side (hereinafter referred to as "the cathode off-gas discharge passage") in a state of extending from the fuel cell stack 1 among the off-gas discharge passages on the anode side and the cathode side. A discharge passage (not illustrated) is also provided for an anode off-gas, and this anode off-gas discharge passage is also in a state of extending from the fuel cell stack 1.

The fuel reformer 2 is interposed in the anode gas supply passage 11. Raw fuel for a fuel cell is supplied to the fuel reformer 2 from a fuel tank, which is not illustrated, through this anode gas supply passage 11. And meanwhile, a combustion gas generated in a combustor 4 to be described later is introduced into the fuel reformer 2. In the fuel reformer 2, the raw fuel is heated by heat exchange using the combustion gas as a hot fluid, which causes steam reforming of the raw fuel and generate hydrogen which is a fuel gas. Thereby, it is possible to supply hydrogen, which is a fuel gas, to the anode electrode of the fuel cell. An aqueous solution of an oxygen-containing fuel (for example, ethanol) can be exemplified as the raw fuel for the fuel cell, and the stream reforming of ethanol is expressed by the following equation (2).

$$C_2H_5OH + 3H_2O \rightarrow 6H_2 + 2CO_2 \quad (2)$$

The air heater 3 is interposed in the cathode gas supply passage 12. The air taken into the cathode gas supply passage 12 is supplied to the air heater 3 by an air compressor or blower, which is not illustrated. And meanwhile, the combustion gas generated by the combustor 4 is introduced into the air heater 3. In the air heater 3, the air is heated by heat exchange using the combustion gas as a hot fluid. Thereby, oxygen, which is an oxidant gas, can be supplied to the cathode electrode after being heated to the operable temperature of the fuel cell stack 1 or a temperature close to the operable temperature.

The combustor 4a is connected to the cathode off-gas discharge passage 13. At the time of system startup when the temperature of the fuel cell system S is below the operable temperature thereof (for example, 600° C.), or at the time of low temperature, the combustor 4a receives air through the fuel cell stack 1 and the cathode off-gas discharge passage 13, and meanwhile receives fuel through a fuel supply pipe 14. Then, this fuel is combusted to generate the combustion gas, and the thermal energy of the combustion gas warms up the fuel cell system S. The fuel supply pipe 14 may be connected to the fuel tank described above, although other types of fuel and fuel supply pipe configurations can also be selected, and thereby raw fuel (for example, ethanol) of the fuel cell is supplied to the combustor 4a as fuel. Further, the combustor 4a is a so-called catalytic type combustor, and has a catalyst bed portion 41 where a catalyst for promoting a combustion reaction of fuel is supported.

The combustor 4a is connected to the fuel reformer 2 and the air heater 3 via a combustion gas passage 15. The combustion gas generated in the combustor 4a is supplied to the fuel reformer 2 and the air heater 3 through the combustion gas passage 15, respectively, and is used for the stream reforming of the fuel in the fuel reformer 2 and the heating of the air in the air heater 3, respectively.

Here, in order to produce good fuel combustion in the combustor 4a and to generate a combustion gas having a satisfactory level of thermal energy, it is important to sufficiently mix fuel and air at the time of combustion. If the mixing is insufficient causing the fuel distribution in the mixed gas to become uneven, the combustion temperature rises excessively in the fuel-rich portions, affecting the heat resistance of the combustor 4a, whereas the combustion temperature does not rise sufficiently in the fuel-lean portions, causing uncombusted components of fuel, and there is a concern that the harmful exhaust components contained in the combustion gas may increase. By adopting an evaporative heat exchanger, evaporating fuel and then mixing it with air in a gaseous state, it is possible to promote mixing as compared with the case of mixing by injection of fuel. However, in a configuration wherein a mixing chamber and a catalyst bed portion are arranged next to each other inside a combustor, there is a problem that it is not easy to ensure a distance required for mixing between the mixing chamber and the catalyst bed portion. This is because, if this distance is forcibly ensured, the combustor may be unnecessarily increased in size, and the cost and layout of the combustor 4a will be affected. In addition, there is another concern that fuel may be cooled after the fuel is evaporated and before the fuel reaches the mixing chamber, causing condensation to occur.

Therefore, in this embodiment, as shown in FIG. 1, a vaporizer 42 capable of evaporating fuel is arranged on the downstream side of the catalyst bed portion 41 in the combustor 4a. Thus, by mixing the evaporated fuel with air at a meeting point M near the vaporizer 42 without going through a pipe for transportation to the mixing chamber, the configuration ensures a distance that can contribute to mixing, and intended to promote better mixing of fuel and air, and thereby makes it possible to generate a combustion gas with a satisfactory level of thermal energy while minimizing the environmental load.

(Configuration of Combustor)

Figure 2:
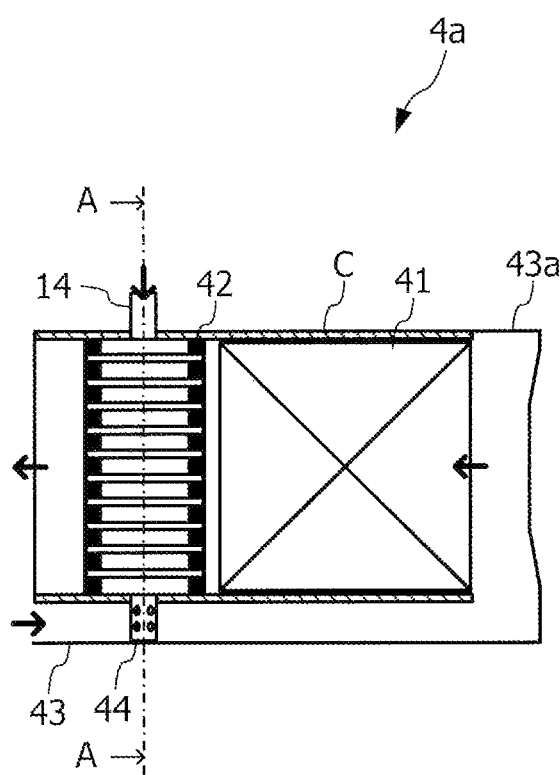
FIG. 2 is a schematic diagram illustrating a configuration of a combustor provided in a fuel cell system according to this embodiment.

FIG. 2 illustrates the configuration of the combustor 4a provided in the fuel cell system S according to this embodiment in a cross section parallel to a streamline that defines the mainstream of gas going through the combustor 4a. With respect to this embodiment and all the embodiments to be described below, "mainstream" of a flow going through a passage means the flow formed on the centerline of the passage.

The combustor 4a according to this embodiment includes the catalyst bed portion 41, the vaporizer 42, and a manifold portion 43 as the main configuration. The fuel supply pipe 14 extending from the fuel tank, which is not illustrated, is connected to the vaporizer 42 so that fuel can be supplied. In this embodiment, the combustor 4a further includes a casing C common to the catalyst bed portion 41 and the vaporizer 42. The catalyst bed portion 41 and the vaporizer 42 are housed in the casing C in a state of being adjacent to each other.

The catalyst bed portion 41 has a carrier where a catalyst is supported, and the catalyst bed portion 41 is configured to promote the combustion reaction of a fuel (for example, ethanol) by the catalyst to generate combustion gas of the fuel. The generated combustion gas is discharged to the combustion gas passage 15 via the vaporizer 42 to be described below as the output of the combustor 4a.

The vaporizer 42 is arranged on the downstream side of the catalyst bed portion 41 with respect to a flow of the fuel going through the catalyst bed portion 41. The vaporizer 42 is configured to be able to use the combustion gas generated from the combustion reaction in the catalyst bed portion 41 as a hot fluid, and is configured to be able to use the fuel supplied via the fuel supply pipe 14 as a cold fluid. The vaporizer 42 evaporates the fuel by exchanging heat with the combustion gas.

The manifold portion 43 is arranged outside the casing C containing the catalyst bed portion 41 and the vaporizer 42 so as to guide air in the direction opposite to the flow of fuel going through the catalyst bed portion 41. As mentioned earlier, the air flowing through the manifold portion 43 is supplied from the cathode gas supply passage 12 via the fuel cell stack 1. In this embodiment, the manifold portion 43 has a swirling portion 431 which is coaxially with the catalyst bed portion 41 at a connection portion with the catalyst bed portion 41 and is configured so that a swirling component in the circumferential direction can be applied to the flow of mixed gas introduced into the catalyst bed portion 41. As the mixed gas passes through the swirling portion 431, the mixing of fuel and air is further promoted.

A fuel introducing pipe 44 is interposed between the vaporizer 42 and the manifold portion 43, and is configured so that the fuel evaporated by the vaporizer 42 can be introduced into internal of the manifold portion 43 via this fuel introducing pipe 44. The fuel introducing pipe 44 constitutes a "fuel introducing portion" according to this embodiment. The manifold portion 43 has a wall portion on which a sidewall of the vaporizer 42, that is the casing C containing the vaporizer 42 in this embodiment, is projected. The fuel introducing pipe 44 penetrates the casing C, and is extended to the inside of the manifold portion 43. In this embodiment, the manifold portion 43 is arranged along the wall surface of the casing C, parallel to the streamline defining the mainstream of gas going through the combustor 4a, and the projection of the casing C is oriented perpendicular to the flow of combustion gas in the vaporizer 42. Further, in this embodiment, as will be described later, the casing C and the wall portion of the manifold portion 43 are arranged in contact with each other, but by forming a part of the flow path wall surface of the manifold portion 43 with the sidewall of the catalyst bed portion 41 and the vaporizer 42, that is the casing C, the aforementioned "projected wall portion" can be a wall portion shared with the sidewall of the vaporizer 42. Further, the "fuel introducing portion" not only can be configured by preparing a pipe member (fuel introducing pipe 44) and interposing the pipe member, but also can be configured without using a separate member. For example, when the casing C and the wall portion of the manifold portion 43 are in contact with each other, through holes are formed in both of them, and the inside of the vaporizer 42 and the inside of the manifold portion 43 are communicated with each other via these through holes.

(Configuration of Fuel Introducing Portion)

FIGS. 3A-3B 4A-4B 5A-5B and 6 are cross-sectional views taken along the line A-A shown in FIG. 2 of the combustor 4a according to this embodiment, and schematically illustrate the shape of the manifold portion 43 and the arrangement of the fuel introducing pipe 44, at the meeting point M (Ma-Mg). In each of FIGS. 3A-3B 4A-4B 5A-5B and 6, the conduit of the vaporizer 42 forming the flow path of combustion gas is not illustrated for convenience.

Figure 3A:
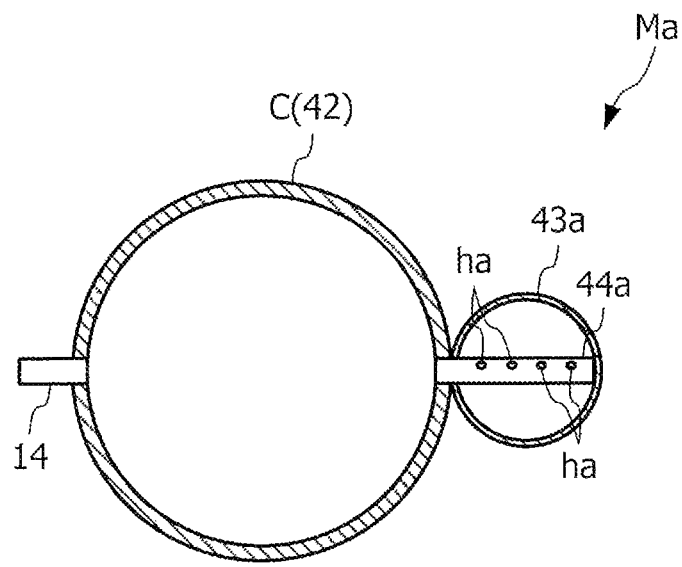
FIG. 3A is a cross-sectional view taken along the line A-A shown in FIG. 2 of a combustor according to this embodiment, and is an example in which a cross section of a manifold portion is a perfect circle.
Figure 3B:
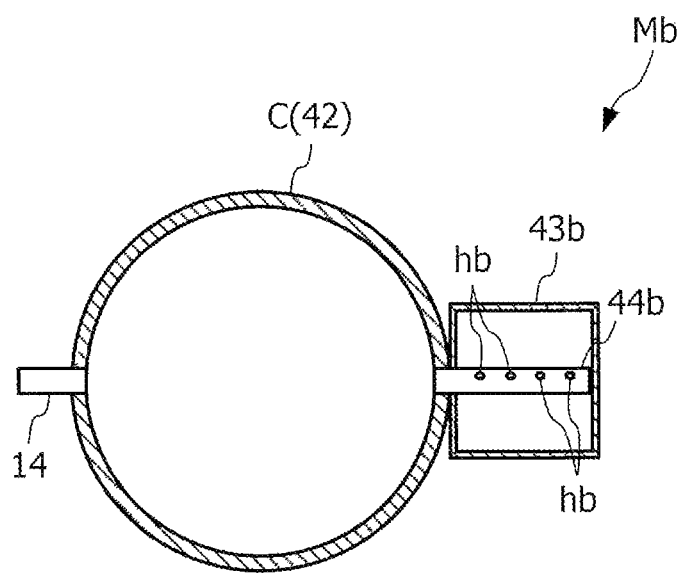
FIG. 3B is a cross-sectional view taken along the line A-A shown in FIG. 2 of a combustor according to a modification of this embodiment, and is an example in which a cross section of a manifold portion is a square.

FIGS. 3A and 3B illustrate the combustor 4a according to an example of this embodiment.

In each example of FIGS. 3A-3B, the fuel introducing pipes 44a and 44b consist of linear pipe members. The fuel introducing pipes 44a and 44b are set to a length that penetrates the casing C and the wall portions of the manifold portions 43a and 43b and protrudes inside the manifold portions 43a and 43b. The fuel introducing pipes 44a and 44b may traverse the interior of the manifold portions 43a and 43b, or may terminate between the opposing inner walls. The cross-sections of the manifold portions 43a and 43b are perfectly circular in the example of FIG. 3A and square in the example of FIG. 3B. That is, the examples, wherein the cross-sections of these manifold portions 43a and 43b do not have a long dimension and a short dimension, have been shown.

The fuel introducing pipes 44a and 44b have a plurality of openings ha and hb inside the manifold portions 43a and 43b to outflow the fuel evaporated by the vaporizer 42. FIGS. 3A-3B (the same applies to FIGS. 4A-4B, 5A-5B, 6) illustrate an example of having a total of eight openings, four each in the front and back with respect to the air flow going through the manifold portions 43a and 43b, but other number of openings may also be adopted.

Figure 4A:
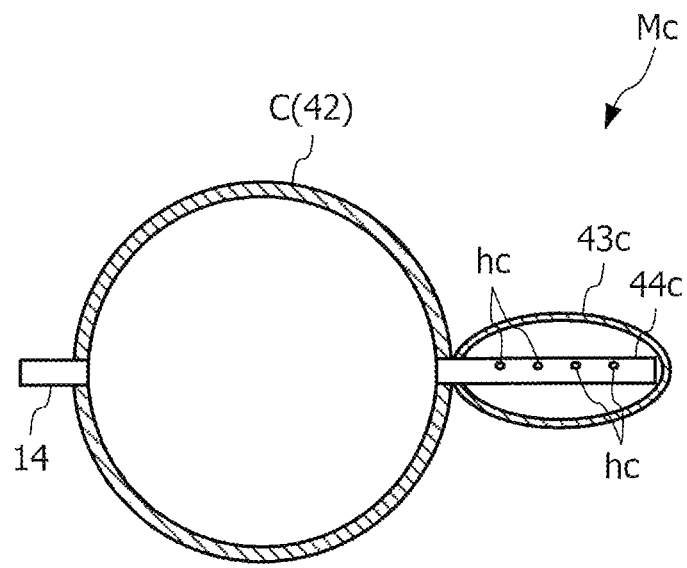
FIG. 4A is a cross-sectional view taken along the line A-A shown in FIG. 2 of a combustor according to a modification of this embodiment, and is an example in which a cross section of a manifold portion is an oval.
Figure 4B:
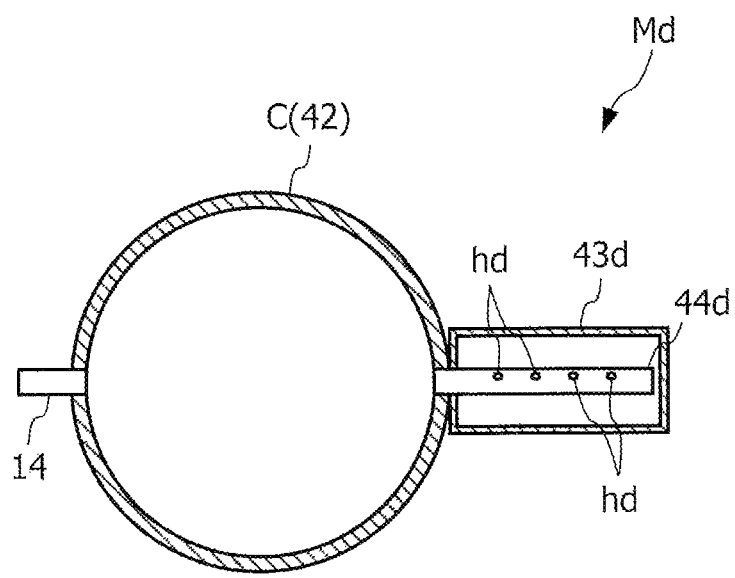
FIG. 4B is a cross-sectional view taken along the line A-A shown in FIG. 2 of a combustor according to a modification of this embodiment, and is an example in which a cross section of a manifold portion is a rectangle.

FIGS. 4A and 4B illustrate the combustor 4a according to the first modification of this embodiment.

Regarding each example of FIGS. 4A and 4B, the manifold portions 43c and 43d each have a long dimension and a short dimension in a cross-section perpendicular to the air flow. The cross-sections of the manifold portions 43c and 43d are oval in the example of FIG. 4A and rectangular in the example of FIG. 4B, and the direction of the long dimension is set perpendicular to the tangent line at the connection point with the casing C. The fuel introducing pipes 44c and 44d are extended in the direction of the long dimension inside the manifold portions 43c and 43d. The fuel introducing pipes 44c and 44d consist of linear pipe members, as in each example of FIG. 3, and are set to a length that penetrates the casing C and the wall portions of the manifold portions 43c and 43d and protrudes inside the manifold portions 43c and 43d. The fuel introducing pipes 44c and 44d may traverse the interior of the manifold portions 43c and 43d, or may terminate between the opposing inner walls, as in each example of FIGS. 3A and 3B. The fuel introducing pipes 44c and 44d have a plurality of openings hc and hd inside the manifold portions 43c and 43d to outflow the fuel evaporated by the vaporizer 42.

Figure 5A:
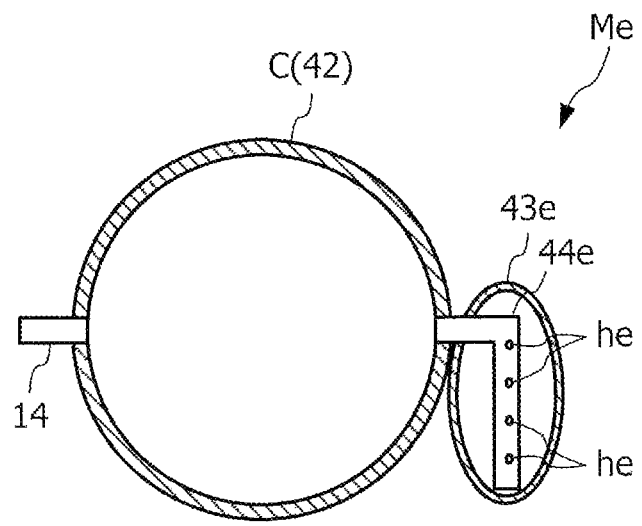
FIG. 5A is a cross-sectional view taken along the line A-A shown in FIG. 2 of a combustor according to another modification of this embodiment, and is an example in which a cross section of a manifold portion is an oval.
Figure 5B:
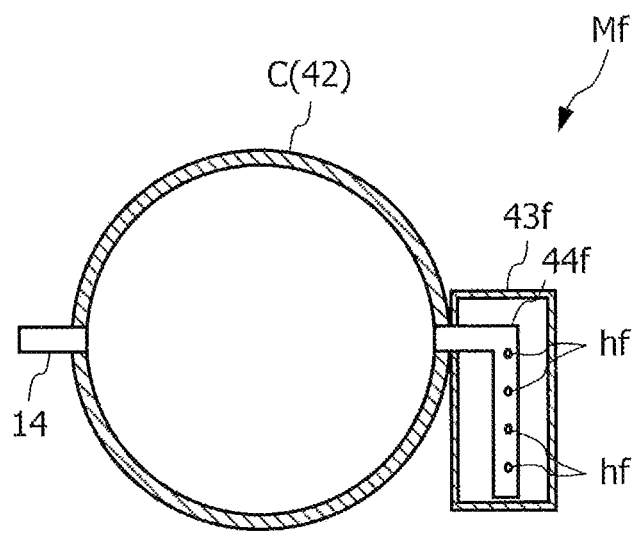
FIG. 5B is a cross-sectional view taken along the line A-A shown in FIG. 2 of a combustor according to another modification of this embodiment, and is an example in which a cross section of a manifold portion is an oval.

FIGS. 5A and 5B illustrate the combustor 4a according to the second modification of this embodiment.

Regarding each example of FIGS. 5A and 5B, the manifold portions 43e and 43f each have a long dimension and a short dimension in a cross-section perpendicular to the air flow, and the cross-section is oval in the example of FIG. 5A and rectangular in the example of FIG. 5B, as in each example of FIG. 4. In each example of FIG. 5A-5B, however, the direction of the long dimension is set parallel to the tangent line at the connection point with the casing C, and the fuel introducing pipes 44e and 44f are extended in the direction of the long dimension inside the manifold portions 43e and 43f. Specifically, the fuel introducing pipes 44e and 44f are set to a length that penetrates the casing C and the wall portions of the manifold portions 43e and 43f, and protrudes inside the manifold portions 43e and 43f, and each have a bending portion (or curved portion) that diverts the extending direction from a direction perpendicular to the casing C to a direction parallel to the casing C. The tips of the fuel introducing pipes 44e and 44f may be abutted against the inner surfaces of the manifold portions 43e and 43f, or may be terminated in front of them, as in each example of FIGS. 3A-3B and 4A-4B. The fuel introducing pipes 44e and 44f have a plurality of openings he and hf in the portions extending in the direction of the long dimension of the manifold portions 43e and 43f to outflow the fuel evaporated by the vaporizer 42.

Figure 6:
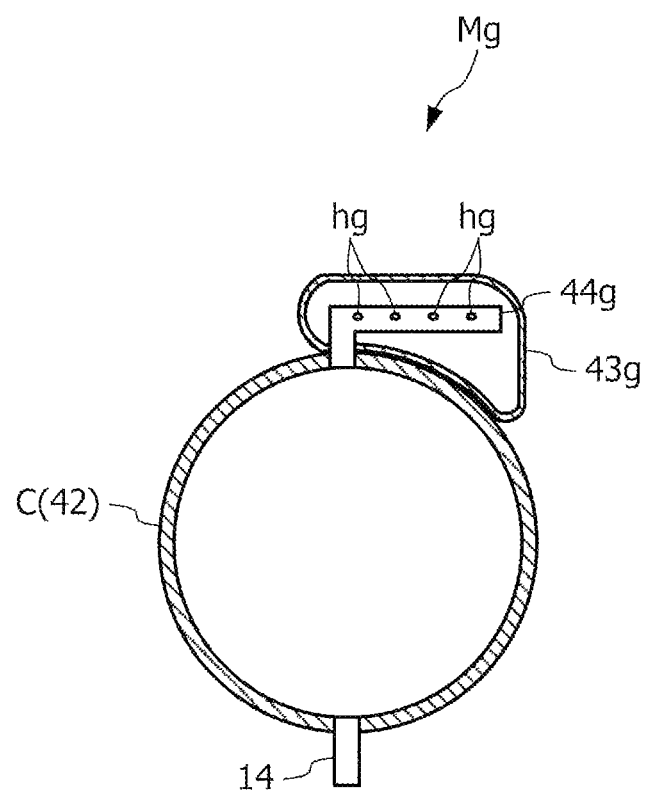
FIG. 6 is a cross-sectional view taken along the line A-A shown in FIG. 2 of a combustor according to still another modification of this embodiment.

FIG. 6 illustrates the combustor 4a according to the third modification of this embodiment.

In the example of FIG. 6, the manifold portion 43g has a long dimension and a short dimension in a cross-section perpendicular to the air flow, and the cross section has a flat shape that is long in a direction along the outer circumference of the casing C and is crushed in a direction perpendicular to the casing C. In the example of FIG. 6, the direction of the long dimension is set parallel to the tangent line on the outer surface of the casing C at the insertion point of the fuel introducing pipe 44g, and the fuel introducing pipe 44g is extended in the direction of the long dimension inside the manifold portion 43g. Specifically, as same in the example of FIGS. 5A and 5B, the fuel introducing pipe 44g is set to a length that penetrates the casing C and the wall portion of the manifold portion 43g, and protrudes inside the manifold portion 43g, and has a bending portion that diverts the extending direction from a direction perpendicular to the casing C to a direction parallel to the casing C. In this embodiment, the angle of the bending portion is set to a right angle, but it can also be set to an acute angle. This makes it possible to extend the fuel introducing pipe 44g and provide a larger number of openings hg. As in the examples above, the tip of the fuel introducing pipe 44g may be abutted against the inner surface of the manifold portion 43g, or may be terminated in front of the inner surface, and further, also as in the examples above, the fuel introducing pipe 44g has a plurality of openings hg for outflowing fuel vapor at the portion extending in the direction of the long dimension.

(Arrangement of Openings)

Figure 7A:
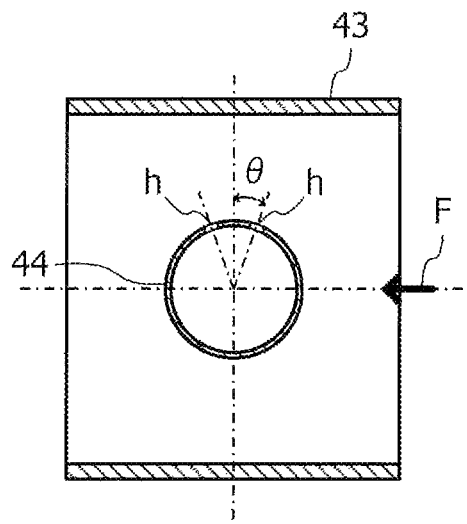
FIG. 7A is a schematic diagram illustrating a configuration of an opening provided in a fuel introducing portion of a combustor.
Figure 7B:
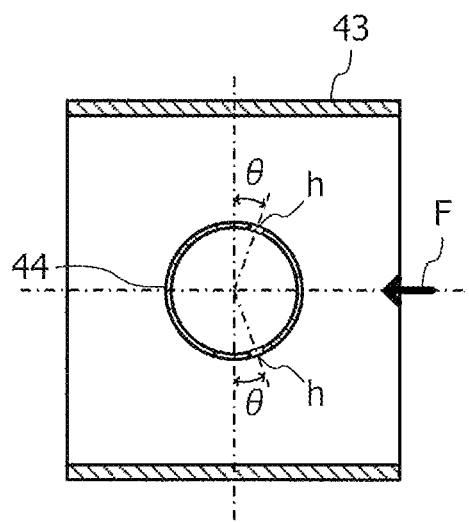
FIG. 7B is a schematic diagram illustrating another configuration of an opening provided in a fuel introducing portion of a combustor.

FIGS. 7A and 7B illustrates the arrangement of the openings h provided in the fuel introducing pipe 44 of the combustor 4a according to this embodiment as represented by the examples shown in FIGS. 3A and 3B in a state of being viewed from the tip side of the fuel introducing pipe 44 in the extending direction thereof.

As described above, in this embodiment, a plurality of openings h is provided at intervals in the extending direction of the fuel introducing pipe 44. Further, as shown in FIG. 7A, in the cross section parallel to the flow F of air in the manifold portion 43, the openings h are provided on both sides of the center of the fuel introducing pipe 44, specifically, in the front and back of the center in the direction of the flow F. The openings h are oriented obliquely with respect to the line perpendicular to the streamline that defines the mainstream direction, and in this embodiment, oriented in directions that each make an angle θ of 30° or less with respect to this perpendicular line. The orientations of the openings h are defined by lines extending radially from the center of the fuel introducing pipe 44.

The arrangement of the openings h is not limited to this, and may be replaced with a front-and-back arrangement with respect to the center of the fuel introducing pipe 44, or in addition to this, as shown in FIG. 7B, the openings h may be provided on the upper and lower sides or the left and right sides with respect to the center in a state of being viewed in the direction opposite to the flow F. As described above, the openings h are oriented obliquely with respect to the line perpendicular to the streamline that defines the mainstream direction, specifically, oriented in directions that each make an angle θ of 30° or less with respect to this perpendicular line, and the orientations of the openings h are defined by lines extending radially from the center of the fuel introducing pipe 44.

(Description of Actions and Effects)

The fuel cell system S according to this embodiment is configured as described above, and the actions and effects obtained by this embodiment will be described below.

First, by providing the wall portion on which the sidewall of the vaporizer 42 is projected, on the main body of the combustor 4a, that is, the manifold portion 43 that guides air toward the catalyst bed portion 41 so that the fuel evaporated by the vaporizer 42 can be introduced into the manifold portion 43 through this wall portion by the fuel introducing pipe 44, it is possible to ensure the distance used for mixing fuel and air before reaching the catalyst bed portion 41, and therefore, the mixing of fuel and air can be promoted prior to the introduction to the catalyst bed portion 41. Thereby, it is possible to generate the combustion gas with a satisfactory level of thermal energy while uniformly causing combustion in the catalyst bed portion 41 and suppressing the emission of harmful exhaust components, and it is possible to promote the warm-up of the fuel cell system S.

Second, by bringing the sidewall of the vaporizer 42 and the wall portion of the manifold portion 43 (especially the "projected wall portion" thereof) into contact with each other, it is possible to promote the heat transfer from the vaporizer 42 to the manifold portion 43 and suppress the decrease in temperature inside the manifold portion 43, and therefore, condensation can be suppressed in the fuel flowing through the manifold portion 43. Further, by sharing the wall portion of the manifold portion 43 with the sidewall of the vaporizer 42, it is possible to reduce the heat dissipation area of the manifold portion 43 and better promote the heat transfer from the vaporizer 42.

Third, by protruding the fuel introducing pipe 44 into the manifold portion 43, it is possible to suppress uneven distribution of fuel over the cross section of the manifold portion 43.

Fourth, by extending the fuel introducing pipe 44 inside the manifold portion 43 in the direction of the long dimension in the cross section of the manifold portion 43, it is possible to distribute fuel more uniformly over the cross section of the manifold portion 43.

Fifth, by defining the long dimension of the manifold portion 43 in the direction along the sidewall of the vaporizer 42, it is possible to further promote the reduction of the heat dissipation area of the manifold portion 43 and further promote the heat transfer from the vaporizer 42, and therefore, it is possible to suppress the condensation of fuel more reliably.

Sixth, by providing the fuel introducing pipe 44 with a plurality of openings h, ha-hg, which outflow fuel, it is possible to distribute fuel more uniformly over the cross section of the manifold portion 43.

Seventh, by orienting the plurality of openings h obliquely with respect to the streamline that defines the mainstream direction in the manifold portion 43, it is possible to promote more uniform mixing of fuel and air, and to shorten the distance required for mixing.

Eighth, by orienting the plurality of openings h in directions that each make an angle of 30° or less in the front and back with respect to the line perpendicular to the flow line of the mainstream of the manifold portion 43, it is possible to mix fuel and air better, and to shorten the distance required for mixing.

Ninth, by defining the orientations of the plurality of openings h by lines extending from the center of the fuel introducing pipe 44, it is possible to smoothly flow fuel from the fuel introducing pipe 44 into the manifold portion 43.

Tenth, by providing the plurality of openings h on both sides of the center of the fuel introducing pipe 44, that is, on the upper and lower sides or the left and right sides with respect to the center, it is possible to mix fuel and air better, and to shorten the distance required for mixing.

(Description of Other Embodiments)

Figure 8A:
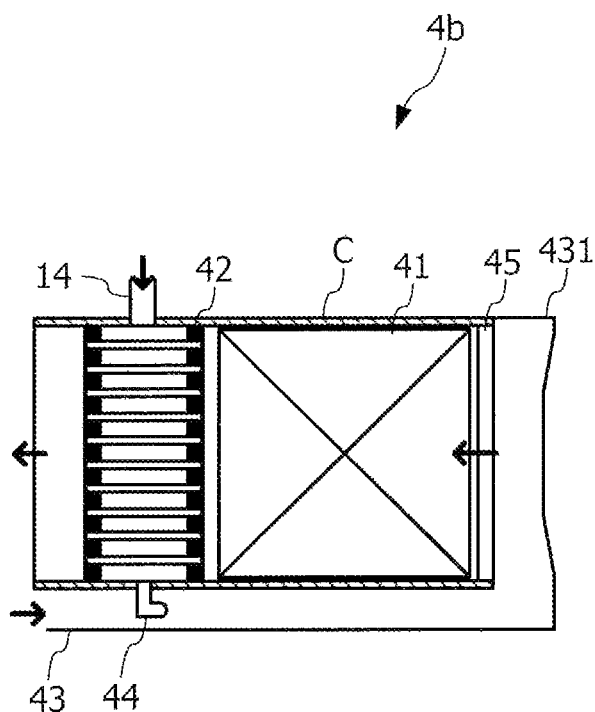
FIG. 8A is a schematic diagram illustrating a configuration of a combustor provided in a fuel cell system according to another embodiment of the present invention in the same cross section as FIG. 2.
Figure 8B:
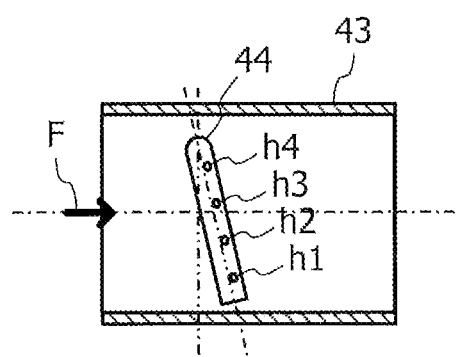
FIG. 8B is a schematic diagram illustrating a configuration of a combustor provided in a fuel cell system according to another embodiment of the present invention in a cross section of a manifold portion parallel to an air flow.

FIG. 8 illustrates a configuration of a combustor 4b provided in the fuel cell system S according to another embodiment of the present invention, FIG. 8A illustrates the configuration of the combustor 4b by a cross section similar to that of FIG. 2, and FIG. 8B illustrates the configuration of the combustor 4b in a cross section of the manifold portion 43 parallel to the flow F of air in the manifold portion 43, respectively.

In this embodiment, in an introducing portion of the mixed gas for the catalyst bed portion 41, in other words, between the swirling portion 431 of the manifold portion 43 and the catalyst bed portion 41, a mixer plate 45 configured to enhance the swirling flow of the mixed gas to be introduced into the catalyst bed portion 41 is interposed. The swirling portion 431 of the manifold portion 43 and this mixer plate 45 constitute the "mixing promoting portion" according to this embodiment. In addition to this, in this embodiment, the fuel introducing pipe 44 is configured to be tilted inside the manifold portion 43 with respect to the line perpendicular to the streamline that defines the mainstream direction in the manifold portion 43. Among a plurality of openings h (h1-h4), the opening h1, which outflows fuel toward the centrifugal side of the swirling flow of the mixed gas, is configured to be positioned on the downstream side of the opening h4, which outflows fuel toward the center side of this swirling flow, with respect to the flow in the manifold portion 43.

Thus, by providing the mixer plate 45 together with the swirling portion 431, the mixing of fuel and air is further promoted, and by positioning the opening h1, which is on the centrifugal side with respect to the swirling flow, downstream of the opening h4 which is on the center side, it is possible to make the flow velocity of the mixed gas flowing into the catalyst bed portion 41 via the swirling portion 431 more uniform and the space velocity in the catalyst bed portion 41 uniform, and therefore, it is possible to suppress the variation in combustion temperature and the increase of harmful exhaust components.

Figure 9:
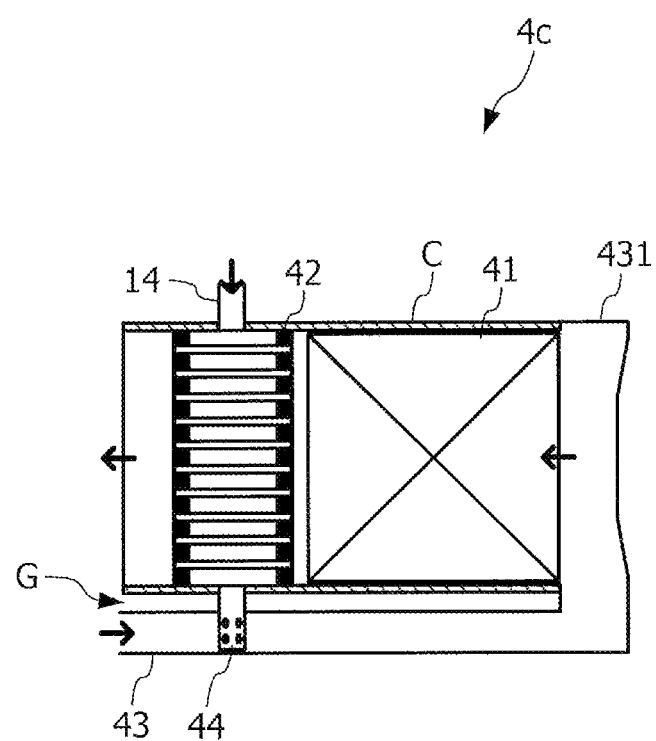
FIG. 9 is a schematic diagram illustrating a configuration of a combustor provided in a fuel cell system according to still another embodiment of the present invention.

FIG. 9 illustrates a configuration of a combustor 4c provided in the fuel cell system S according to still another embodiment of the present invention in the same cross section as FIG. 2.

In this embodiment, a gap G is provided between the sidewalls of catalyst bed portion 41 and the vaporizer 42, that is, between the casing C containing these elements and the wall portion of manifold portion 43. Other configurations are the same as those of the above-described embodiment (FIG. 2).

Thus, by allowing the manifold portion 43 to be arranged away from the sidewall of the vaporizer 42 or casing C, the degree of freedom regarding the arrangement of the manifold portion 43 is increased, and therefore, it is possible to form a flow suitable for mixing fuel and air while avoiding interference with peripheral components. Here, the width of the gap G can be set as appropriate, but by arranging the manifold portion 43 close to the casing C or the vaporizer 42, it is possible to maintain the effect of suppressing the condensation of fuel generated in the process of flowing through the manifold portion 43 as much as possible.

While the embodiments of the present invention have been described above, the above-described embodiments only show part of application examples of the present invention and are not intended to limit the technical scope of the present invention to the specific configurations of the above-described embodiments. Various modifications and alterations can be made to the above-described embodiments within the scope of the matter recited in the claims.

The present application claims a priority based on Japanese Patent Application No. 2019-161388 filed with the Japan Patent Office on Sep. 4, 2019, all the contents of which are incorporated into this specification by reference.

The invention claimed is:

1. A combustor, comprising:
    a catalyst bed portion supporting a catalyst capable of promoting a combustion reaction of fuel;
    a vaporizer which is arranged on the downstream side of the catalyst bed portion with respect to a flow of the fuel going through the catalyst bed portion and is configured to be able to use a combustion gas generated from the combustion reaction as a hot fluid;
    a manifold portion which is outside the catalyst bed portion and guides air in a direction opposite to the flow of the fuel going through the catalyst bed portion and comprises a wall portion which is in contact with or shared with a sidewall of the vaporizer; and
    a fuel introducing portion configured to penetrate the wall portion of the manifold portion in a region of the manifold portion that guides the air in the direction opposite to the flow of the fuel going through the catalyst bed portion so that the fuel evaporated by the vaporizer can be introduced into the manifold portion.

2. The combustor according to claim 1, wherein:
    the fuel introducing portion comprises a pipe member extending from the vaporizer toward the manifold portion; and the pipe member protrudes inside the manifold portion.

3. The combustor according to claim 2, wherein:
    the manifold portion has a long dimension and a short dimension in a cross-section perpendicular to the air flow; and the pipe member extends in the direction of the long dimension inside the manifold portion.

4. The combustor according to claim 3, wherein:
the long dimension of the manifold portion is defined in a direction along the sidewall of the vaporizer.

5. The combustor according to claim 2, wherein:
the pipe member has a plurality of openings for outflowing the fuel evaporated by the vaporizer inside the manifold portion.

6. The combustor according to claim 5, wherein:
the plurality of openings is oriented obliquely with respect to a streamline that defines the mainstream direction in the manifold portion.

7. The combustor according to claim 6, wherein:
the plurality of openings is oriented in a direction forming an angle of 30° or less with respect to a line perpendicular to the flow line in at least one of the front and back with respect to the mainstream direction.

8. The combustor according to claim 5, wherein:
the orientations of the plurality of openings are defined by lines extending from the center of the pipe member.

9. The combustor according to claim 8, wherein:
the plurality of openings is provided on both sides of the center in a direction perpendicular to a flow in the manifold portion.

10. The combustor according to claim 5, wherein:
the manifold portion includes a mixing promoting portion configured so that a swirling component in the circumferential direction can be applied to the flow of mixed gas introduced into the catalyst bed portion; and
the fuel introducing portion is configured so that among the plurality of openings, an opening, which discharges fuel toward the centrifugal side of a swirl, is positioned on the downstream side of another opening, which discharges fuel toward the center side of the swirl, with respect to the flow in the manifold portion.

11. A fuel cell system, comprising:
the combustor according to claim 1; and
a fuel cell, wherein:
a cathode off-gas passage of the fuel cell is connected to the manifold portion; and
the fuel cell system is configured to be able to supply the air to the manifold portion via the fuel cell.

12. A combustor, comprising:
a catalyst bed portion supporting a catalyst capable of promoting a combustion reaction of fuel;
a vaporizer which is arranged on the downstream side of the catalyst bed portion with respect to a flow of the fuel going through the catalyst bed portion and is configured to be able to use a combustion gas generated from the combustion reaction as a hot fluid;
a manifold portion which is outside the catalyst bed portion and guides air in a direction opposite to the flow of the fuel going through the catalyst bed portion and comprises a wall portion which is in contact with or shared with a sidewall of the vaporizer; and
a fuel introducing portion configured to penetrate the wall portion of the manifold portion so that the fuel evaporated by the vaporizer can be introduced into the manifold portion, the fuel introducing portion having a pipe member extending from the vaporizer toward the manifold portion and protruding inside the manifold portion.

13. The combustor according to claim 12, wherein:
the manifold portion has a long dimension and a short dimension in a cross-section perpendicular to the air flow; and the pipe member extends in the direction of the long dimension inside the manifold portion.

14. The combustor according to claim 13, wherein:
the long dimension of the manifold portion is defined in a direction along the sidewall of the vaporizer.

15. The combustor according to claim 12, wherein:
the pipe member has a plurality of openings for outflowing the fuel evaporated by the vaporizer inside the manifold portion.

16. The combustor according to claim 15, wherein:
the plurality of openings is oriented obliquely with respect to a streamline that defines the mainstream direction in the manifold portion.

17. The combustor according to claim 16, wherein:
the plurality of openings is oriented in a direction forming an angle of 30° or less with respect to a line perpendicular to the flow line in at least one of the front and back with respect to the mainstream direction.

18. The combustor according to claim 15, wherein:
the orientations of the plurality of openings are defined by lines extending from the center of the pipe member.

19. The combustor according to claim 18, wherein:
the plurality of openings is provided on both sides of the center in a direction perpendicular to a flow in the manifold portion.

20. The combustor according to claim 15, wherein:
the manifold portion includes a mixing promoting portion configured so that a swirling component in the circumferential direction can be applied to the flow of mixed gas introduced into the catalyst bed portion; and
the fuel introducing portion is configured so that among the plurality of openings, an opening, which discharges fuel toward the centrifugal side of a swirl, is positioned on the downstream side of another opening, which discharges fuel toward the center side of the swirl, with respect to the flow in the manifold portion.

* * * * *

UNITED STATES PATENT AND TRADEMARK OFFICE
CERTIFICATE OF CORRECTION

| | | |
|---|---|---|
| PATENT NO. | : 12,308,487 B2 | Page 1 of 1 |
| APPLICATION NO. | : 17/640089 | |
| DATED | : May 20, 2025 | |
| INVENTOR(S) | : Usuda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this
Thirtieth Day of September, 2025

John A. Squires
*Director of the United States Patent and Trademark Office*